Feb. 20, 1951     C. C. PERRY     2,542,429
FISHING LURE
Filed April 6, 1948
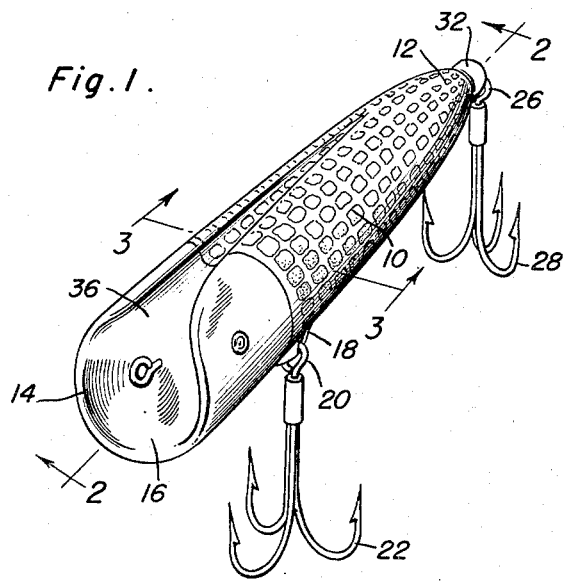
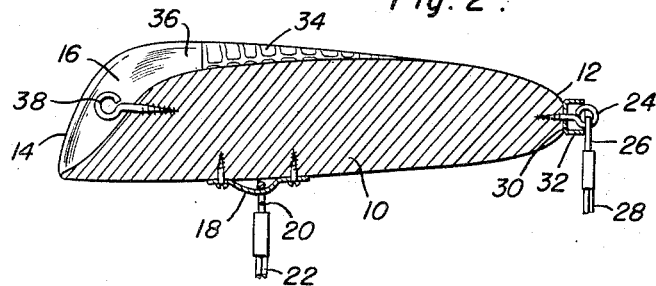
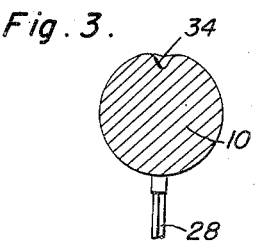
Inventor
Charley C. Perry
By *Clarence A. O'Brien and Harvey B. Jacobson*
Attorneys Patented Feb. 20, 1951

2,542,429

UNITED STATES PATENT OFFICE 2,542,429

FISHING LURE

Charley C. Perry, Camden, Ark.

Application April 6, 1948, Serial No. 19,417

2 Claims. (Cl. 43—42.48)

This invention relates to new and useful improvements in fish lures, and the primary object of the present invention is to provide a novel and improved fishing lure that is so designed as to dip into and out of a fluid medium as the same is pulled by a line, thus simulating the live action of a water creature, which affords a great attraction for various species of fish.

Another important object of the present invention is to provide a fishing device including a lure body having an inclined and concaved leading end portion and a longitudinal groove communicating with the leading end portion thereof and flared toward the leading end portion so that as the body is pulled through a fluid medium the same will dart back and forth as well as up and down both above and below the water surface for attracting fish thereto.

A further object of the present invention is to provide an artificial bait that is neatly constructed and colored to attract fish thereto and which is quickly and readily applied to or removed from a fishing line or leader in a convenient manner.

A still further aim of the present invention is to provide a fishing lure that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the fishing lure constructed in accordance with the present invention;

Figure 2 is a longitudinal vertical sectional view of the present lure taken substantially on the plane of section line 2—2 of Figure 1, and with the hooks thereof broken away and shown in part; and Figure 3 is a transverse vertical sectional view of the present lure taken substantially on the plane of section line 3—3 of Figure 1, and with parts of the rear hook broken away.

Referring now to the drawings in detail wherein, for the purpose of illustration, there is disclosed a preferred embodiment of the present invention, the numeral 10 represents a substantially conical body of suitable buoyant material that includes a trailing or minor end portion 12 and an inclined major end or leading end portion 14.

The major end portion 14 of the body 10 is formed with a concaved face or channeled groove 16 that inclines forwardly and downwardly as best illustrated in Figure 2 of the drawings.

Fixed to the lower periphery of the body 10, adjacent the major end 14 thereof, is a removable support bracket 18 that loosely engages the eye portion 20 of a forward gang of the depending hooks 22, and removably secured to the trailing end 12 of the lure body 10 is an eye member 24 that loosely engages the eye portion 26 of a rear gang of depending hooks 28. This eye member 24 holds, fixed to the trailing end 12 of the body 10, a substantially cup-shaped shield and spacer element 30 and includes a flanged portion 32 which embraces the eye member 24 and which limits the hinged or pivotal movement of the rear gang of hooks 28 toward the body 10.

The numeral 34 represents a longitudinal, substantially V-shaped or channel-shaped groove that is formed in the upper surface of the body 10 and which inclines inwardly and forwardly toward the concaved end portion 14 of the body 10. It should be noted that the forward portion 36 of this groove 34 is flared outwardly to communicate with the concaved face 16 of the body 10 for a purpose which will later be more fully apparent.

Removably secured to the major end portion 14 of the body 10, at the central portion thereof, is a forward eye member 38 that engages a suitable fishing line (not shown) whereby the present lure is pulled through a fluid medium.

In practical use of the present invention, as the body 10 is pulled through a fluid medium, the fluid will engage the channeled groove 16 which is so designed as to deflect the fluid therefrom and the body 10 will dip or rise and fall with a wobbling motion. Further, the fluid will engage groove 34, which will also effect a dipping motion to the body, as well as an endwise or sidewise movement to the body so that the same will both rise and fall vertically and horizontally, thus simulating the live action of a water creature which will attract species of fish thereto. It is noted that during certain instances when the fluid medium engages the concaved face 16 of the body 10 and the groove 34 formed therein, said body will dip well below the upper surface of the fluid medium. However, the same will continue to wobble or dart back and forth as the same is continued to be pulled through the fluid medium.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fish lure comprising an elongated substantially conical body having a concaved recess in its major end, said body having an upper surface and a longitudinally extending groove provided in the upper surface, said groove extending from a point between the minor end of the body and the central portion of the body and intersecting said recess, said groove increasing progressively in width and depth toward said concaved recess.

2. A fish lure comprising an elongated substantially conical body having a concaved recess in its major end, said body having an upper surface and a single longitudinally extending groove provided in said body, said groove being disposed in the upper surface of said body and having inner and outer ends, the inner end of said groove being disposed between the minor end of said body and the central portion of said body, and the outer end of said groove entering said recess, said groove increasing progressively in width and depth from its inner end to its outer end, a line receiving member fixed to the major end of said body and having a portion positioned in said recess, a first hook mounted on the minor end of said body, and a second hook depending from the body adjacent the major end thereof.

CHARLEY C. PERRY.

REFERENCES CITED

The following references are of record in the file of this patent:

UNITED STATES PATENTS

| Number | Name | Date |
|---|---|---|
| D. 147,101 | Adams et al. | July 15, 1947 |
| 1,060,873 | Wilson | May 6, 1913 |
| 2,100,289 | Khoenle | Nov. 23, 1937 |